(12) United States Patent
Imazaki et al.

(10) Patent No.: US 7,778,672 B2
(45) Date of Patent: Aug. 17, 2010

(54) PORTABLE ELECTRONIC DEVICE AND CARRIER TELEPHONE EQUIPMENT

(75) Inventors: Kazunori Imazaki, Kanagawa (JP); Toshiaki Sato, Tokyo (JP)

(73) Assignees: Sony Ericsson Mobile Communications Japan, Inc., Tokyo (JP); Sony Corporation, Tokyo (JP)

( * ) Notice: Subject to any disclaimer, the term of this patent is extended or adjusted under 35 U.S.C. 154(b) by 921 days.

(21) Appl. No.: 11/086,155

(22) Filed: Mar. 22, 2005

(65) Prior Publication Data

US 2005/0215292 A1    Sep. 29, 2005

(30) Foreign Application Priority Data

Mar. 24, 2004    (JP) ............................ P2004-087202

(51) Int. Cl.
    *H04B 1/38*    (2006.01)
(52) U.S. Cl. .................. 455/566; 455/90.3; 455/550.1; 455/575.1
(58) Field of Classification Search ................ None
    See application file for complete search history.

(56) References Cited

U.S. PATENT DOCUMENTS

| | | | |
|---|---|---|---|
| 5,515,303 A | 5/1996 | Cargin, Jr. et al. | |
| 5,584,054 A | 12/1996 | Tyneski et al. | |
| 5,742,894 A | 4/1998 | Jambhekar et al. | |
| 6,731,913 B2 * | 5/2004 | Humphreys et al. | 455/90.3 |
| 7,092,520 B2 * | 8/2006 | Fuhrmann et al. | 379/433.11 |
| 2001/0042681 A1 * | 11/2001 | Yoon et al. | 200/517 |
| 2003/0148795 A1 | 8/2003 | Moriki | |
| 2003/0194974 A1 * | 10/2003 | Curtis et al. | 455/90.1 |
| 2004/0043799 A1 * | 3/2004 | Ishibashi et al. | 455/575.1 |
| 2005/0192064 A1 * | 9/2005 | Thomas et al. | 455/575.1 |

FOREIGN PATENT DOCUMENTS

| | | |
|---|---|---|
| EP | 1 292 086 | 3/2003 |
| JP | 2000 305698 | 11/2000 |
| JP | 2003 288152 | 10/2003 |
| WO | WO 03 030497 | 4/2003 |
| WO | WO 03 030518 | 4/2003 |

* cited by examiner

*Primary Examiner*—Vincent P Harper
*Assistant Examiner*—Mazda Sabouri
(74) *Attorney, Agent, or Firm*—Frommer Lawrence & Haug LLP; William S. Frommer; Thomas F. Presson

(57) ABSTRACT

A device holder is placed on the lower region of a display unit, and part of an operating unit is placed on the holder. The operating unit is overlapping the display unit. Moreover, operating buttons other than those mounted on the holder are shaped so that the portions thereof projecting from a housing will have a substantially triangular cross section. Consequently, a finger with which the operating buttons are manipulated touches the portion of each of the operating buttons corresponding to the apex of the triangular cross section, that is, touches each of the operating buttons along a line. A degree to which the operating buttons are incorrectly manipulated is decreased, and the maneuverability of the operating buttons is held satisfactory. Moreover, the space between adjoining operating buttons is narrowed. Consequently, a portable cellular phone is greatly downsized to an extent equivalent to both a degree to which the operating unit is overlapping the display unit and a degree to which the space between adjoining operating buttons is narrowed.

21 Claims, 7 Drawing Sheets

DIRECTION OF LIQUID CRYSTAL DISPLAY

PORTION PROJECTING FROM HOUSING

PORTION STORED IN HOUSING

FIG. 6B

PORTABLE ELECTRONIC DEVICE AND CARRIER TELEPHONE EQUIPMENT

BACKGROUND OF THE INVENTION

1. Field of the Invention

The present invention relates to a portable electronic device and carrier telephone equipment preferably adapted to a portable cellular phone, a personal handyphone system (PHS), a personal digital assistant (PDA), a handheld electronic dictionary, a handheld gaming device, a recording and/or reproducing device for a recording medium such as a CD, an MD, a DVD, a hard disk, or a semiconductor memory, a controller connected on a connection line linking the recording and/or reproducing device and earphones (or headphones).

2. Description of the Related Art

A portable electronic device having a liquid crystal display unit and an operating unit incorporated in a physically one and the same housing has been known nowadays. Specifically, the electronic device refers to a stick-type (=straight) portable cellular phone, a personal handyphone system (PHS), a personal digital assistant (PDA), a handheld electronic dictionary, a handheld gaming device, a recording and/or reproducing device for a recording medium such as a CD, an MD, a DVD, a hard disk, or a semiconductor memory, and a controller connected on a connection line linking the recording and/or reproducing device and earphones (or headphones).

A patent document (Japanese Unexamined Patent Application Publication No. 6-309992) has disclosed the structure of an operating unit (keypad) employed in the electronic device, for example, the portable cellular phone.

In general, the liquid crystal display unit and operating unit are stand-alone members. Therefore, when the liquid crystal display unit and operating unit are incorporated in physically one and the same housing, the housing must have a size calculated by adding up an area required for the liquid crystal display unit and an area required for the operating unit. This poses a problem in that the resultant electronic device becomes large in size.

Therefore, the size of the liquid crystal display unit is reduced, the sizes of operating buttons included in the operating unit are reduced, and the space between adjoining buttons is reduced. Thus, the liquid crystal display unit and operating unit are downsized. Eventually, the electronic device becomes compact.

However, the reduction in the size of the liquid crystal display unit poses a problem in that characters or an image displayed on the liquid crystal display unit becomes hard to see. Moreover, when the size of the operating unit is reduced, an incorrect manipulation of pressing some operating buttons at a time is likely to occur.

Talking of the portable electronic device, the device itself should preferably be designed compactly for higher portability. On the other hand, users demand a large liquid crystal display device for ease of seeing. Moreover, users request an operating unit of excellent maneuverability.

Consequently, the portable electronic device is requested to be designed very compactly while having the area occupied by an operating unit largely reduced without impairment in the display ability of a liquid crystal display unit and the maneuverability of the operating unit.

SUMMARY OF THE INVENTION

According to the primary aspect of the present invention, a support member formed with a hard member is disposed to cover part of the display surface of a display member. At least part of a plurality of operating buttons included in an operating unit is mounted on the support member. Operating buttons other than those mounted on the support member are shaped so that the operating buttons will come into contact with a finger, with which they are manipulated, along a line or at a point.

The support member makes it possible to dispose part (or the whole) of the operating unit on the display member. In other words, the support member makes it possible to overlap an area occupied by the display member and an area occupied by the operating unit (or to agree the area occupied by the display member with the area occupied by the operating unit). Consequently, the overall length of the portable electronic device is shortened by a length equivalent to the degree of overlapping.

Consequently, a large display member that is highly discernible can be adopted without concern about the overall length of the portable electronic device. The display ability of the liquid crystal display unit can be held satisfactory.

Moreover, at least operating buttons other than those mounted on the support member are shaped so that they will come into contact with a finger, with which they are manipulated, along a line or at a point. Consequently, while the maneuverability of the operating buttons is held satisfactory, the space between adjoining operating buttons can be reduced. Eventually, the overall length of the operating unit is further shortened. This results in the very compact portable electronic device.

According to the aspect of the present invention, an area occupied by an operating unit can be greatly reduced without impairment in the display ability of a display member or in the maneuverability of the operating unit. Consequently, while the display ability of the display member and the maneuverability of the operating unit are held satisfactory, a portable electronic device can be drastically downsized.

Other and further objects, features and advantages of the invention will appear more fully from the following description.

DESCRIPTION OF THE PREFERRED EMBODIMENTS

The present invention can be applied to a stick-like (=straight) portable cellular phone.

Figure 1:
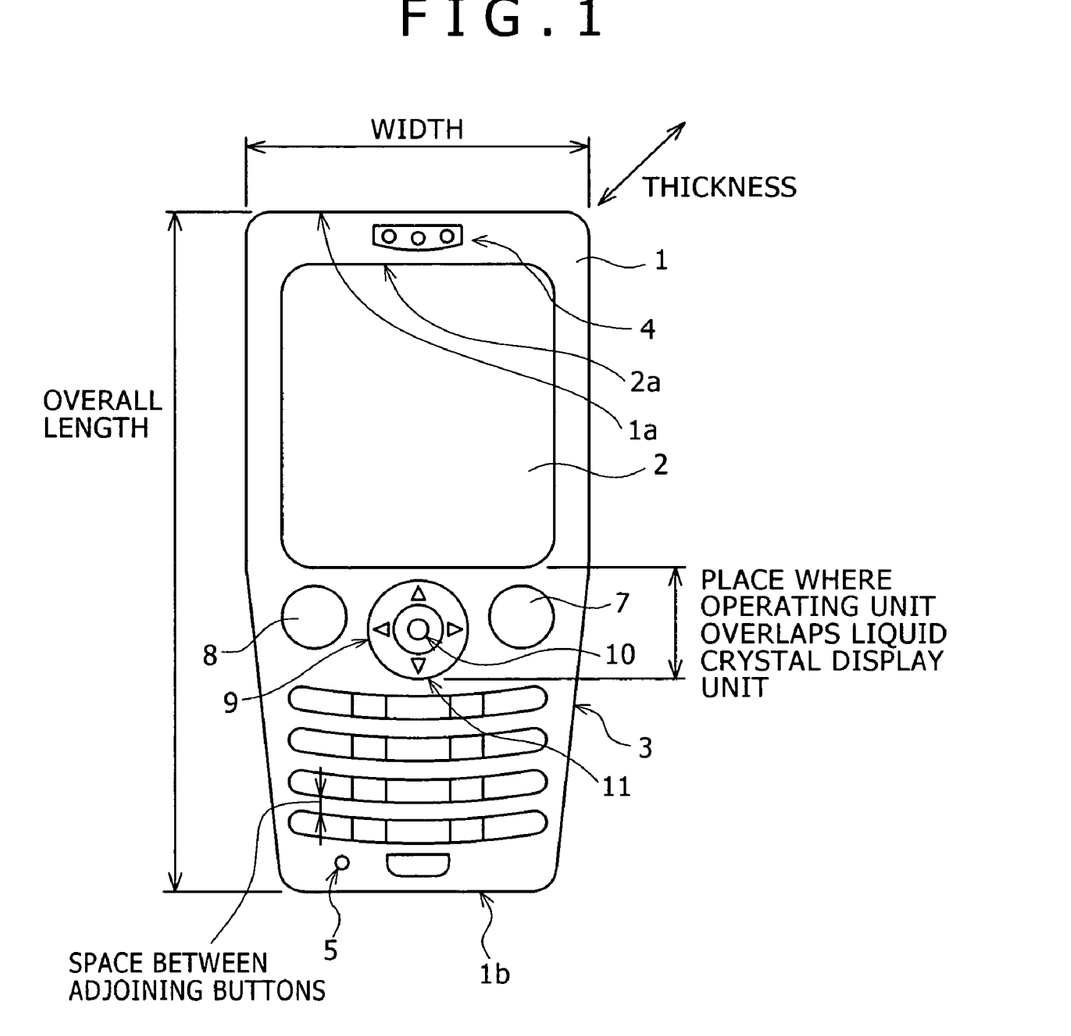
FIG. 1 is a front view of a portable cellular phone that is an embodiment of the present invention.

FIG. 1 is a front view of a portable cellular phone that is an embodiment of the present invention.

The overall length of the portable cellular phone is 76 mm (7.6 cm), the width thereof is 38 mm, and the thickness thereof is 16 mm. The space between adjoining operating buttons is 4.7 mm, and a length by which the operating buttons sink with a stroke of press is 0.25 mm. Noted is that these numerals are presented as a mere example. The portable cellular phone is much more compact than a typical portable cellular phone.

The compactness is attained by applying the present invention. The size of a portable cellular phone can be reduced to be as small as the size of a so-called key holder.

The portable cellular phone comprises, as seen from FIG. 1, a liquid crystal display unit 2 that occupies substantially the upper half of a housing 1, and an operating unit 3 that occupies substantially the lower half of the housing 1. Moreover, the portable cellular phone comprises a loudspeaker 4 interposed between the upper end 2a of the liquid crystal display unit 2 and the upper end 1a of the housing 1, and a microphone 5 located near the lower end 1b of the housing 1.

As mentioned above, since the overall length of the portable cellular phone is as small as 76 mm, when the loudspeaker 4 is put on an ear, the microphone 5 is located away from the mouth. Therefore, the microphone 5 exhibits directivity so that the microphone can appropriately collect a voice a user utters while having speech on the phone even with the user's mouth apart from the microphone.

Moreover, when a user makes a call, the user usually holds the housing 1 with his/her left hand and has speech with the loudspeaker 4 put on the left ear. Therefore, assuming that the portable cellular phone is viewed from the front thereof, the microphone 5 is located on the left lower part of the housing 1 near the lower end 1b thereof so that the microphone will come close to the mouth.

In the present embodiment, the microphone 5 is located in the left lower part of the housing 1 near the lower end 1b thereof. Alternatively, the microphone 5 may be located in the right lower part of the housing 1 near the lower end 1b thereof, or in the central lower part of the housing 1 near the lower end 1b thereof. When the microphone 5 is located in the left or right lower part of the housing 1 near the lower end 1b thereof, a space unoccupied by operating buttons can be used to dispose the microphone 5. Therefore, when the microphone 5 is located in the left or right lower part of the housing 1 near the lower end 1b thereof, the overall length of the portable cellular phone becomes shorter than that attained when the microphone 5 is located in the central lower part near the lower end 1b thereof.

The operating unit 3 includes an on-hook button 7 and an off-hook button 8 that are located close to the liquid crystal display unit 2, and a multifunctional button 9 interposed between the on-hook button 7 and off-hook button 8. Moreover, the operating unit 3 includes thirteen operating buttons between the on-hook button 7, off-hook button 8, and multifunctional button 9 and the lower end 1b of the housing 1.

The multifunctional button 9 has a circular appearance, has an Enter key 10 formed in the center thereof, and has a cross key 11 formed around the Enter key 10. At least the upper, lower, right, and left parts of the cross key 11 can be pressed.

Figure 2:
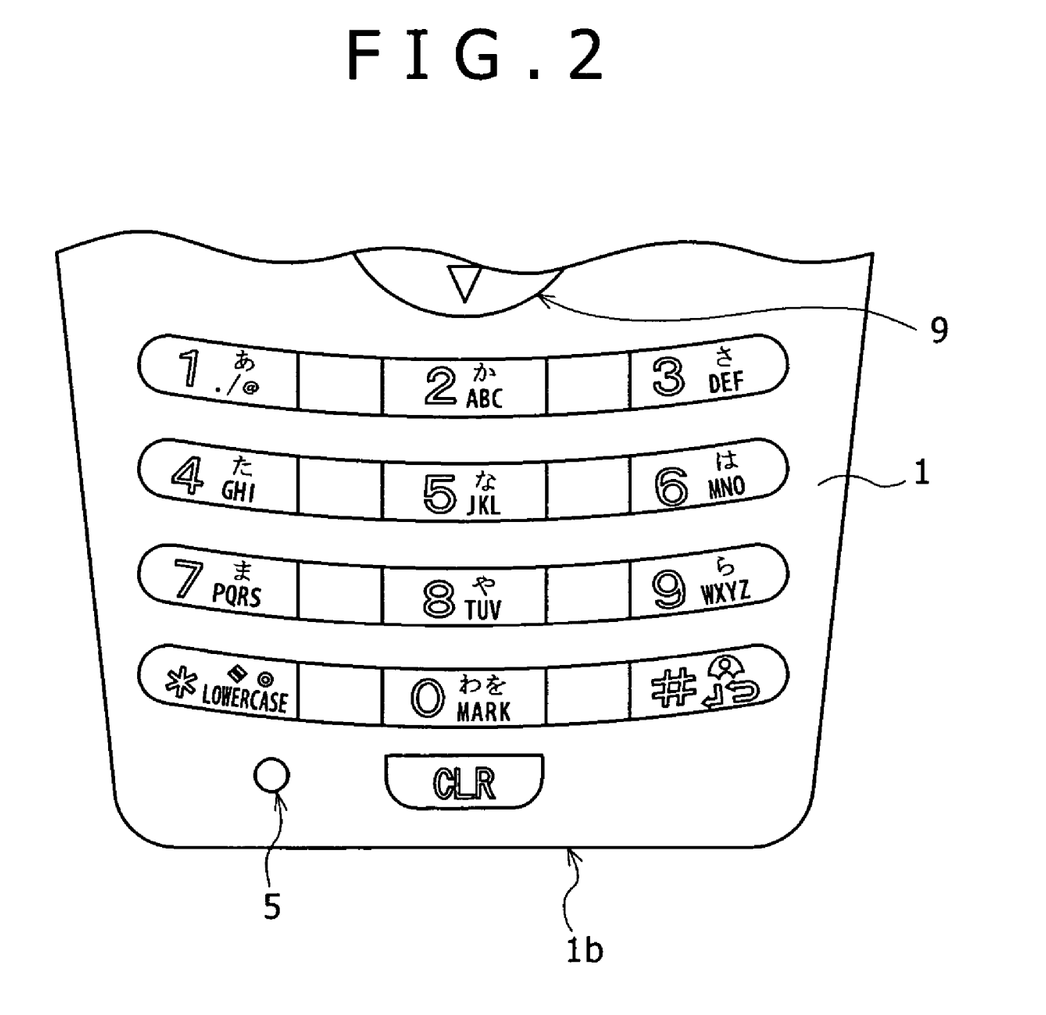
FIG. 2 is an enlarged view of operating buttons included in an operating unit of the portable cellular phone of the embodiment.

In the present embodiment, as shown in FIG. 2, three operating buttons are lined in rows and four operating buttons are lined in columns. Five operating buttons are lined in the center column alone. Numerals from 1 to 0, and leading kana characters of respective groups or a mark # or * are assigned to the respective operating buttons. Moreover, the operating button located in the center column near the lower end 1b of the housing 1 is a Clear (CLR) button for use in designating cancellation of entry of a character.

Now, among the foregoing buttons, the on-hook button 7, off-hook button 8, and multifunctional button 9 are superposed on the lower region of the liquid crystal display unit 2 via a holder 23 described below. The structure will be described below.

Figure 3:
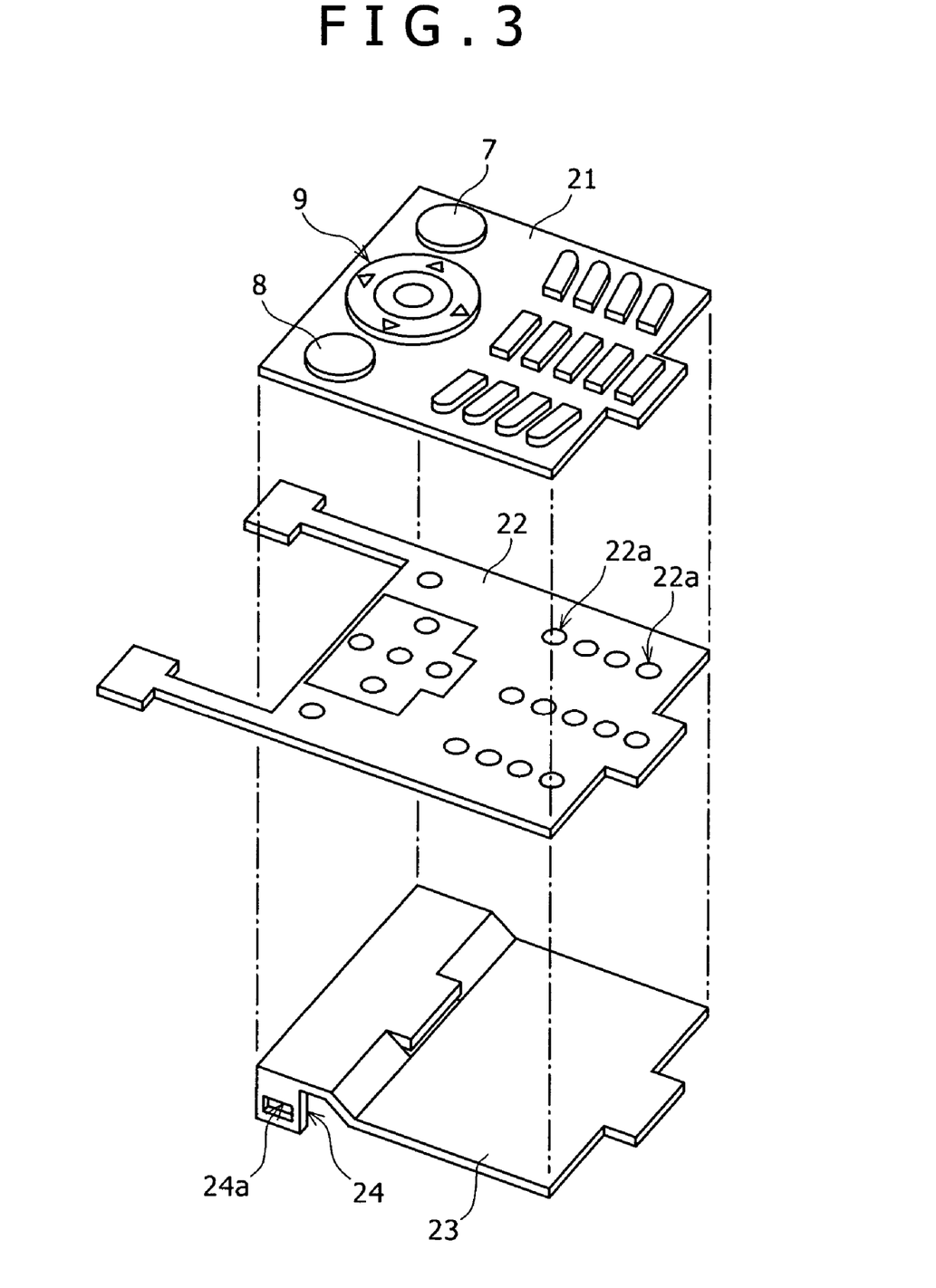
FIG. 3 is an exploded perspective view for explaining a button sheet and a key sheet that are placed on a holder.

The respective buttons included in the operating unit are, as shown in FIG. 3, formed with a thin sheet-like rubber member. The buttons are realized with a rubber sheet 21 having respective button bodies arranged as mentioned previously and bonded thereto, and a key sheet 22 having contacts 22a formed at the positions of the respective buttons thereon.

The rubber sheet 21 is placed on the key sheet 22 so that the button bodies will be located at the positions of the associated contacts 22a. Moreover, the key sheet 22 on which the rubber sheet 21 is placed is mounted on the holder 23 formed with a hard member made of, for example, a metal such as brass, aluminum, copper, or iron, or an ABS resin.

The holder 23 is machined to be stepped to provide a portion on which the on-hook button 7, off-hook button 8, and multifunctional button 9 are mounted and a portion on which the thirteen operating buttons are mounted.

Specifically, the portion of the holder 23 on which the on-hook button 7, off-hook button 8, and multifunctional button 9 are mounted is superposed on the lower region of the liquid crystal display unit 2. Moreover, the portion of the holder 23 other than the portion on which the on-hook button 7, off-hook button 8, and multifunctional button 9 are mounted is a portion on which the operating buttons are mounted. The portion of the housing 1 in which the operating buttons are disposed is gradually sloped in the direction of the thickness of the housing 1 from the terminal of the portion, on which the on-hook button 7, off-hook button 8, and multifunctional button 9 are mounted, towards the lower end 1b of the housing 1 (see FIG. 4).

Figure 4:
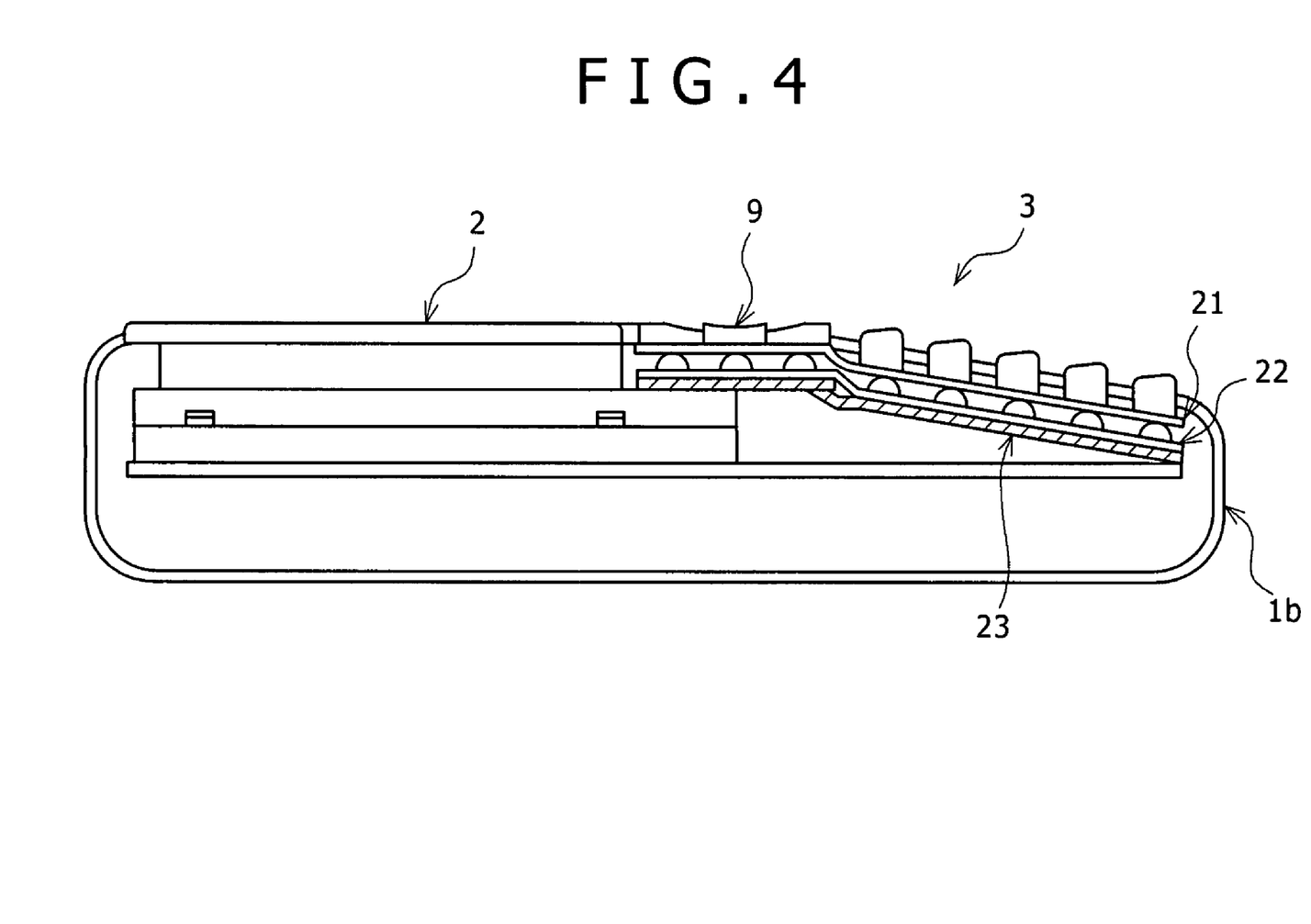
FIG. 4 is a sectional view of the portable cellular phone for explaining the buttons included in the operating unit and mounted on the holder.

Consequently, the portion of the holder 23 on which the on-hook button 7, off-hook button 8, and multifunctional button 9 are mounted is made parallel to the lower region of the liquid crystal display unit 2 so that the portion can be easily placed on the lower region of the liquid crystal display unit 2. In contrast, the portion of the holder 23 on which the operating buttons are mounted is machined to be sloping along the sloping shape of the housing 1.

Moreover, the holder 23 has claws 24 that extend from the edges of the portion, on which the on-hook button 7, off-hook button 8, and multifunctional button 9 are mounted, in the direction of the thickness of the housing 1. The claws 24 each have a fitting hole 24a. When the holder 23 is placed on the lower region of the liquid crystal display unit 2, convex parts of a pedestal of the liquid crystal display unit 2 are fitted into the fitting holes 24a of the respective claws 24. Thus, the holder 23 is aligned with the liquid crystal display unit 2 and locked thereon.

In the present embodiment, the holder 23 is locked on the liquid crystal display device 2 by means of the claws 24. Alternatively, using the claws 24 or any other locking means, the holder 23 may be locked on a substrate or the housing 1.

FIG. 4 is a longitudinal sectional view of the portable cellular phone along the center line thereof. A hatched area in FIG. 4 indicates the section of the holder 23. Referring to FIG. 4, the portion of the holder 23 on which the on-hook button 7, off-hook button 8, and multifunctional button 9 are mounted is placed on the lower region of the liquid crystal display unit 2.

Moreover, the portion of the housing 1 in which the operating buttons are disposed is gradually sloped in the direction of the thickness of the housing 1 from the terminal of the portion, on which the on-hook button 7, off-hook button 8, and multifunctional button 9 are mounted, towards the lower end 1b of the housing 1. The portion of the holder 23 on which the operating buttons are mounted is machined to be sloping along the shape of the housing 1.

Figure 5A:
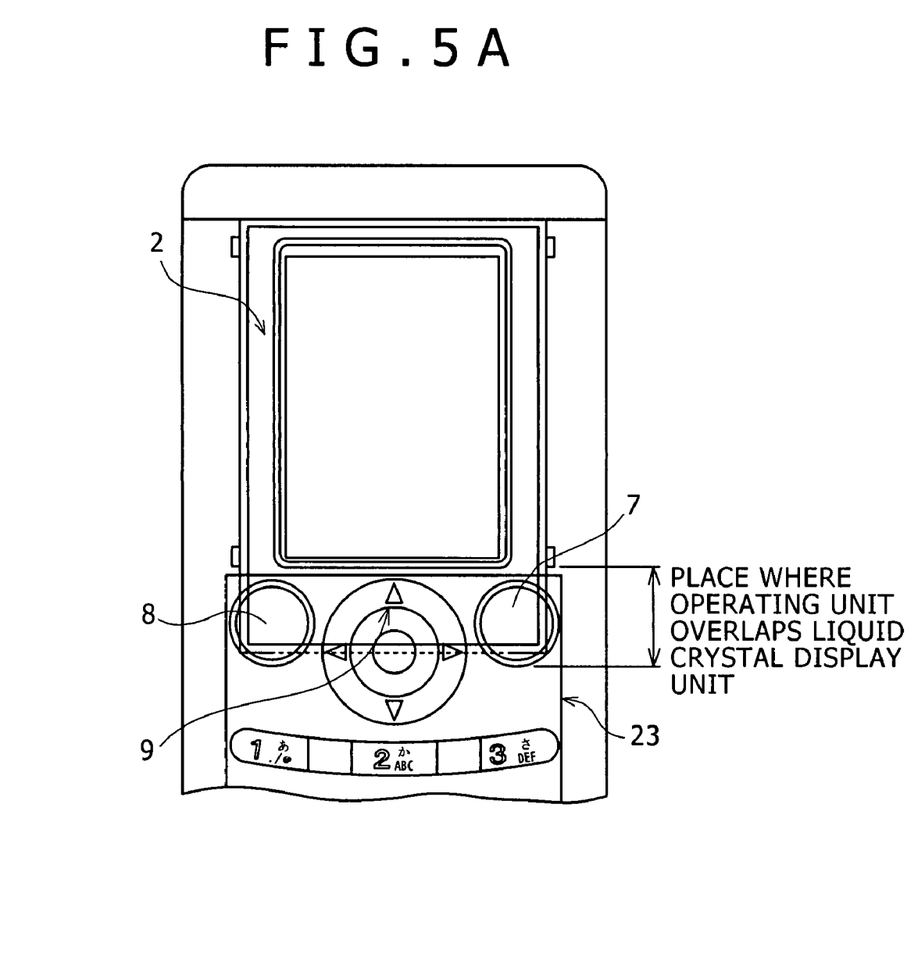
FIG. 5A and FIG. 5B are explanatory diagrams showing a liquid crystal display unit and the operating unit that are overlapping each other owing to the holder.

The on-hook button 7, off-hook button 8, and multifunctional button 9 are mainly pressed. The holder 23 formed with a hard member acts as a so-called bridge and works to protect the liquid crystal display unit 2 and substrate from force exerted in pressing any of the buttons. Therefore, part (the on-hook button 7, off-hook button 8, and multifunctional button 9) of the buttons included in the operating unit can be placed on the liquid crystal display unit 2. In other words, as shown in FIG. 5A, the portion of the operating unit on which part of the buttons is disposed is superposed on the lower region of the liquid crystal display unit 2, that is, the operating unit is overlapped with the liquid crystal display unit 2. The lower region of the liquid crystal display unit 2 is used as a region in which part of the buttons included in the operating unit is disposed.

Figure 5B:
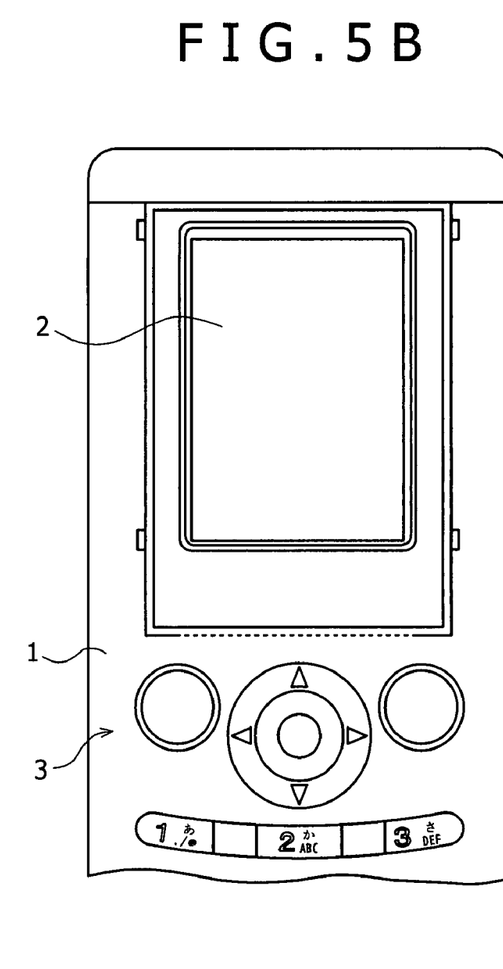

When the region of the operating unit in which part of the buttons is included were not superposed on the lower region of the liquid crystal display unit 2, the liquid crystal display unit 2 and operating unit 3 would be disposed, as shown in FIG. 5B, independently of each other. This increases the overall length of the housing 1 of the portable cellular phone. In the portable cellular phone of the present embodiment, as shown in FIG. 5A, the holder 23 makes it possible to superpose part of the operating unit 3 on the lower region of the liquid crystal display unit 2. Consequently, the overall length of the housing of the portable cellular phone can be shortened by a length equivalent to the degree to which the operating unit overlaps the liquid crystal display unit.

Preferably, the region of the liquid crystal display unit 2 on which part of the operating unit is superposed is a region other than an effective display region. Namely, when the operating unit overlaps the liquid crystal display unit 2, an image or the like displayed on the portion of the liquid crystal display unit on which part of the operating unit is superposed may be rather hard to see due to the presence of the buttons included in the operating unit. Therefore, preferably, part of the operating unit is superposed on the region (other than the effective display region) of the liquid crystal display unit that is not actually used for display.

Moreover, some types of portable cellular phones present a frame (parting region) and display an image or the like within the frame. When such a frame is presented, an effective display region in which an image or the like is actually display presumably falls within the frame. Therefore, when the frame is presented, part of the operating unit may be superposed on the frame.

On the contrary, when the frame is regarded as an integral part of the effective display region, the operating unit is overlapped with the liquid crystal display unit 2 outside the frame.

Moreover, in the present embodiment, the on-hook button 7, off-hook button 8, and multifunctional button 9 are placed on the liquid crystal display unit 2 via the holder 23 (part of the buttons included in the operating unit is placed on the liquid crystal display unit 2). Alternatively, all the buttons included in the operating unit may be placed on the liquid crystal display unit 2 via the holder 23.

In the present embodiment, the holder 23 provides both the portion on which the on-hook button 7, off-hook button 8, and multifunctional button 9 are mounted, and the portion on which the operating buttons other than the on-hook button 7, off-hook button 8, and multifunctional button 9 are mounted.

The holder 23 may be included in order to mount only the on-hook button 7, off-hook button 8, and multifunctional button 9 thereon (may be included to underlie part of the operating unit that is superposed on part of the liquid crystal display unit 2).

As far as the portable cellular phone is concerned, as seen from FIG. 1 and FIG. 2, the operating buttons lined in the right and left columns are disposed slightly closer to the liquid crystal display unit 2 than those in the central column. In other words, each of the rows of operating buttons is, so to speak, bowed to have the right and left operating buttons sloped upwards.

When each of the rows of operating buttons looks is bowed, an area occupied laterally by each of the operating buttons becomes smaller than that is when each of the rows of operating buttons is straightened. Eventually, the width of the portable cellular phone is reduced.

Figure 6A:
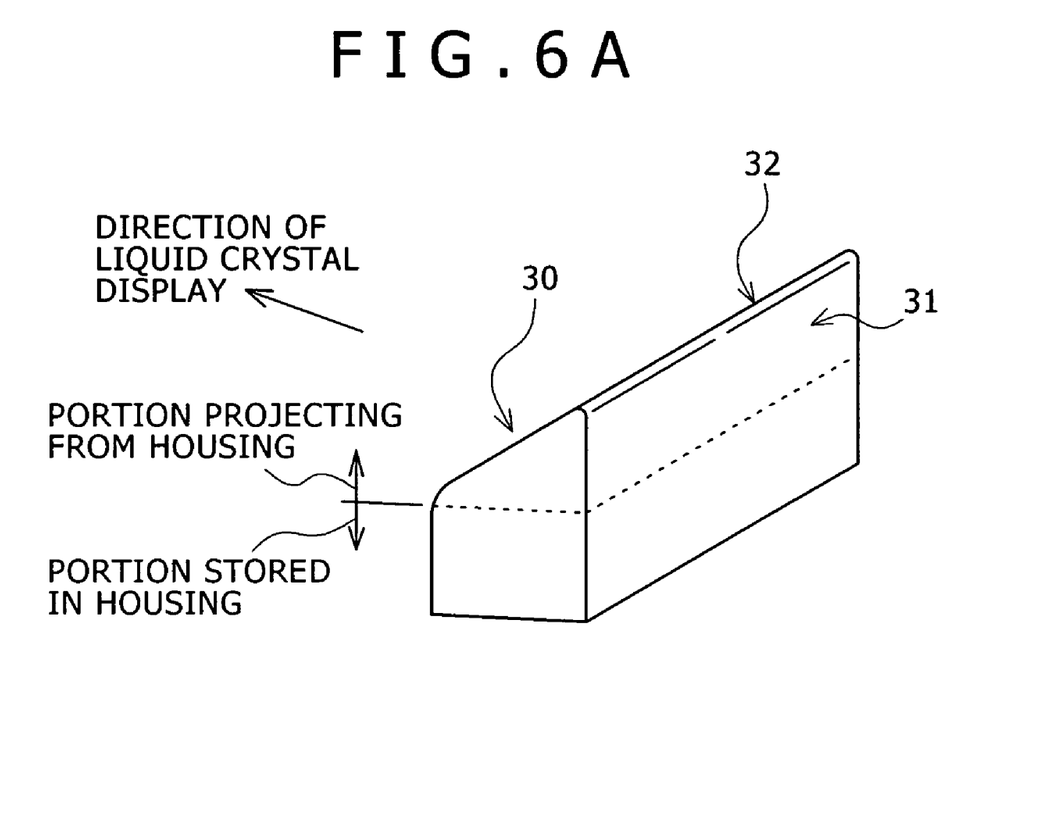
FIG. 6A and FIG. 6B are perspective views showing one of the operating buttons included in the portable cellular phone.

As shown in FIG. 6A, the operating buttons are formed so that the surfaces 30 thereof facing the liquid crystal display unit 2 (i.e. being on the liquid crystal display 2 side) are gradually sloped in the direction of the thickness of the portable cellular phone. The numerals and characters assigned to the respective operating buttons as described in conjunction with FIG. 2 are inscribed on the sloping surfaces 30.

The surfaces 31 of the operating buttons opposite to the surfaces 30 facing the liquid crystal display unit 2 (i.e. being on the liquid crystal display 2 side) extend in the direction of the thickness of the portable cellular phone, that is, extend substantially perpendicularly to the face of the portable cellular phone.

When the operating buttons are put in the housing 1, the portions of the operating buttons projecting from the housing 1 have a substantially triangular cross section. Assuming that any of the operating buttons is pressed with a finger, the finger touches the portion 32 of the operating button corresponding to the apex of the triangular cross section, that is, the finger touches the operating button along a line.

Figure 7:
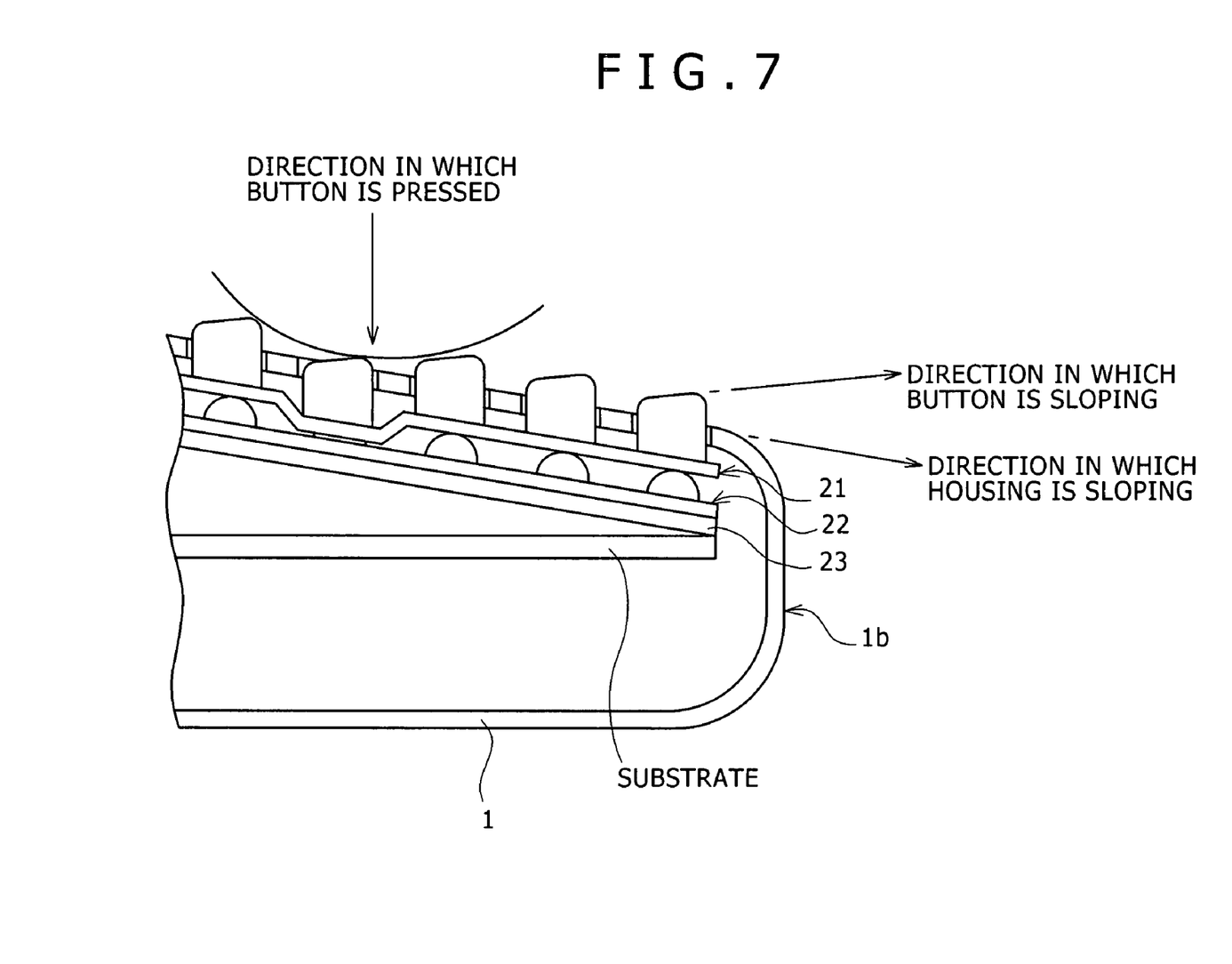
FIG. 7 is a sectional view of the portable cellular phone showing a scene where one of the operating buttons is pressed.

FIG. 7 is a longitudinal sectional view of the portable cellular phone along the center line thereof, showing a scene where one of the operating buttons is pressed. As apparent from FIG. 7, the operating buttons are shaped as mentioned previously and brought into contact with a finger, with which they are manipulated, along a line. The operating buttons are therefore manipulated at the highest portions thereof.

As mentioned previously, since a length by which each of the operating buttons sinks with a stroke of press is as small as 0.25 mm, the magnitude of the press is small. When any of the operating buttons is pressed, a finger with which the operating button is pressed is prevented from touching an adjoining operating button owing to the sloping surface 30. Even when the finger touches the adjoining operating button, an incorrect manipulation of pressing the operating button is avoided.

Moreover, the portion of the housing 1 in which the operating buttons are disposed is gradually sloped towards the lower end 1b of the housing 1 in the direction of the thickness of the housing 1. Therefore, the operating buttons are disposed stepwise to be sloping from the liquid crystal display unit 2 towards the lower end 1b of the housing along the slope of the housing 1. FIG. 4 and FIG. 7 demonstrate that the operating buttons are disposed stepwise.

As mentioned above, since the operating buttons are disposed stepwise, an operating button adjoining a pressed operating button is prevented from being incorrectly manipulated owing to the operation of the sloping surface 30 and the length by which the operating button sinks with a stroke of press. In the present portable cellular phone, since an adjoining operating button is prevented from being incorrectly manipulated, the space between adjoining operating buttons can be narrowed to the greatest possible extent. An area occupied by the operating buttons is therefore reduced. This results in the drastically compact portable cellular phone.

Moreover, since the surface 30 of each operating button is sloping, when the portable cellular phone is seen from the front thereof, characters and others inscribed on the surfaces 30 may be thought to be rather indiscernible. However, since the operating buttons are, as mentioned above, disposed stepwise in the housing 1, the slopes of the surfaces 30 are canceled out by the slope derived from the stepwise disposition. Consequently, when the portable cellular phone is seen from the front thereof, the characters and others inscribed on the surfaces 30 are readily discernible.

Figure 6B:
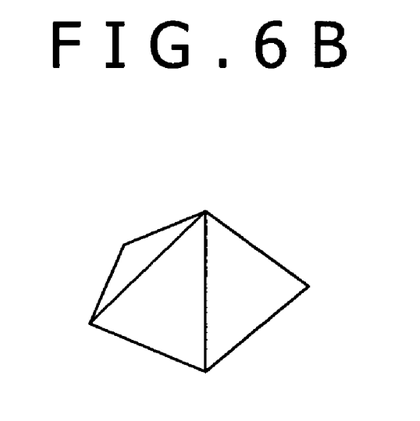

In the present embodiment, the cross section of the portion of each of the operating buttons projecting from the housing 1 is substantially triangular, the operating button comes into contact with a finger, with which it is manipulated, along a line. Alternatively, the portion of each of the operating buttons projecting from the housing may be, as shown in FIG. 6B, shaped like a triangular pyramid so that the operating button will come into contact with a finger, with which it is manipulated, at a point, that is, at the apex of the triangular pyramid. Even in this case, the same advantage as the foregoing one can be provided.

As apparent from the above description, the portable cellular phone of the present embodiment has the holder 23 placed on the lower region of the liquid crystal display unit 2. Part of the operating unit 3 (on-hook button 7, off-hook button 8, and multifunctional button 9) is mounted on the holder 23. Thus, the operating unit 3 is overlapped with the liquid crystal display unit 2. This enables downsizing of a portable cellular phone.

Moreover, each of the rows of the operating buttons other than the on-hook button 7, off-hook button 8, and multifunctional button 9 is disposed (bowed) to have the right and left operating buttons sloped upwards. An area laterally occupied by each of the operating buttons becomes smaller than it is when each of the rows of the operating buttons is straightened. This results in the reduced width of the portable cellular phone.

Moreover, the operating buttons other than the on-hook button 7, off-hook button 8, and multifunctional button 9 are shaped so that the portions thereof projecting from the housing 1 will have a substantially triangular cross section. A finger with which the operating buttons are manipulated touches the portion 32 of any of the operating buttons, which corresponds to the apex of the triangular cross section, that is, touches the operating button along a line. Therefore, the operating button is manipulated at the highest position thereof. When the operating button is pressed with a finger, the finger is prevented from touching an adjoining operating button owing to the sloping surface 30. Even when the finger touches the adjoining operating button, the adjoining operating button is prevented from being incorrectly manipulated or pressed.

Moreover, the portion of the housing 1 in which the operating buttons are disposed is gradually sloped towards the lower end 1b of the housing 1 in the direction of the thickness thereof. The operating buttons are disposed stepwise to be sloping from the liquid crystal display unit 2 towards the lower end 1b of the housing 1 along the slope of the housing 1. Consequently, an operating button adjoining a pressed operating button is prevented from being incorrectly manipulated.

Consequently, since an adjoining operating button is prevented from being incorrectly manipulated, the space between adjoining buttons included in the portable cellular phone of the present embodiment can be narrowed to the greatest possible extent. The area occupied by the operating buttons is therefore small. This results in the drastically compact portable cellular phone.

Since an adjoining operating button is prevented from being incorrectly manipulated, even when the space between adjoining operating buttons is narrowed, the maneuverability of the operating unit 3 can be held satisfactory.

Moreover, since the operating unit 3 overlaps the liquid crystal display unit 2 and the space between adjoining operating buttons is narrowed, the area occupied by the operating unit 3 is greatly reduced. Owing to the reduction in the area, the large liquid crystal display unit 2 can be employed without the necessity of increasing the size of the housing 1. Since the liquid crystal display unit 2 is large, an image or characters are highly discernible.

Finally, the present invention will not be limited to the foregoing embodiment. For example, the present invention is described to be applied to a portable cellular phone. Alternatively, the present invention may be applied to a personal handyphone system (PHS), a personal digital assistant (PDA), a handheld electronic dictionary, a handheld gaming device, a recording and/or reproducing device for a CD, an MD, a DVD, a hard disk, a semiconductor memory, or any other recording medium, or a controller connected on a connection line linking the recording and/or reproducing device and earphones (or headphones). Even in this case, the present invention will prove effective in downsizing an electronic device to which the present invention is applied.

The present invention is not limited to the foregoing embodiment and variant. The present invention can be modified in various manners according to a layout or the like without a departure from the technological gist.

What is claimed is:

1. A portable electronic device comprising:
    a display member comprising a liquid crystal display (LCD);
    a support member formed with a hard member and disposed to cover part of the display surface of the liquid crystal display (LCD); and
    an operating unit including a plurality of operating buttons lined in a plurality of columns, having at least part of the plurality of operating buttons mounted on the support member, and having at least operating buttons other than the operating buttons mounted on the support member shaped to come into contact with a finger, with which the operating buttons are manipulated, along a line or at a point,
    a key sheet member having contacts formed at the positions of the respective buttons:
    wherein at least part of the plurality of the operating buttons mounted on the support member are located at positions of contacts that overlap with a portion of the liquid crystal display (LCD),
    wherein the support member is positioned between the overlapping contacts and the overlapping portion of the liquid crystal display (LCD),
    wherein the support member includes a first portion being parallel to the overlapped portion of the liquid crystal display (LCD), and a second portion being sloping along the direction in which the thickness of the device decreases,
    wherein the key sheet member includes a first potion being parallel to the overlapped portion of the LCD, and a second portion being sloping along the direction in which the thickness of the device decreases, wherein the operating buttons other than the operating buttons mounted on the support member have at least the surfaces thereof, which are on the display member side, sloped in the direction of the thickness of the portable electronic device, and come into contact with a finger, with which the operating buttons are manipulated, along a line, wherein a stroke of press of the operating buttons projecting from a housing of the electronic device prevents the finger from manipulating an adjoining operating button, and wherein the portions of the operating buttons projecting from the housing of the electronic device have a substantially triangular cross section.

2. The portable electronic device according to claim 1, wherein the housing of the electronic device has a surface thereof, in which at least the operating buttons other than the operating buttons mounted on the support member are disposed, sloped toward the end of the housing opposite to the end thereof close to the display device in the direction of the thickness of the housing.

3. The portable electronic device according to claim 1, wherein the support member covers a portion of the display member other than an effective display region thereof.

4. The portable electronic device according to claim 1, wherein the support member has claws for locking the support member.

5. A portable electronic device comprising:
a housing;
a display unit comprising a liquid crystal display (LCD), disposed in the upper part of the housing when the housing is seen from the front thereof;
an operating unit that is disposed in the lower part of the housing when the housing is seen from the front thereof, the operating unit including a plurality of operating buttons lined in a plurality of columns, and that has a first button located in a region thereof close to the display unit and has a second button located in a region thereof opposite to the display unit beyond the first button; and
a holder on which the operating unit is mounted and which is placed on at least part of the liquid crystal display (LCD), wherein:
a key sheet member having contacts formed at the positions of the respective buttons;
the first button mounted on the holder is located at a position of a contact that overlaps with a portion of the liquid crystal display (LCD),
wherein the holder is positioned between the overlapping contact and the overlapping portion of the liquid crystal display (LCD), and
wherein the holder includes a first portion being parallel to the overlapped portion of the liquid crystal display (LCD), and a second portion being sloping along the direction in which the thickness of the device decreases; and
wherein the key sheet member includes a first potion being parallel to the overlapped portion of the LCD, and a second portion being sloping along the direction in which the thickness of the device decreases,
the second button has at least the surfaces thereof, which are on the display unit side, sloped in the direction of the thickness of the portable electronic device, and come into contact with a finger, with which the first button and the second button are manipulated, along a line,
wherein a stroke of press of the first button projecting from the housing prevents the finger from manipulating the second button, and wherein the portions of the first button and the second button projecting from the housing have a substantially triangular cross section.

6. The portable electronic device according to claim 5, wherein the housing has at least the surface thereof, in which the second button is disposed, sloped towards the end of the housing opposite to the end thereof close to the display unit in the direction of the thickness of the housing.

7. The portable electronic device according to claim 5, wherein: the holder has a first portion on which the first button is mounted and a second portion on which the second button is mounted; and the first portion is superposed on part of the display unit.

8. The portable electronic device according to claim 7, wherein the second portion of the holder is sloped from the terminal of the first portion towards the end of the housing, and the first portion and second portion have a step between them.

9. The portable electronic device according to claim 7, wherein the first portion of the holder is substantially parallel to the display unit.

10. The portable electronic device according to claim 7, wherein the holder is placed on a portion of the display unit other than an effective display region thereof.

11. The portable electronic device according to claim 7, wherein the holder has claws for locking the holder.

12. The portable electronic device according to claim 7, wherein the holder is formed with a hard member.

13. A portable electronic device comprising:
a display means comprising a liquid crystal display (LCD);
a support means formed with a hard member and disposed to cover part of the display surface of the liquid crystal display (LCD); and
an operating means including a plurality of operating buttons lined in a plurality of columns, having at least part of the plurality of operating buttons mounted on the support means, and having operating buttons other than the operating buttons mounted on the support means shaped to come into contact with a finger, with which the operating buttons are manipulated, along a line or at a point,
a key sheet member having contacts formed at the positions of the respective buttons;
wherein at least part of the plurality of the operating buttons mounted on the support means are located at positions of contacts that overlap with a portion of the liquid crystal display (LCD),
wherein the support means is positioned between the overlapping contacts and the overlapping portion of the liquid crystal display (LCD),
wherein the support means includes a first portion being parallel to the overlapped portion of the liquid crystal display (LCD), and a second portion being sloping along the direction in which the thickness of the device decreases,
wherein the key sheet member includes a first potion being parallel to the overlapped portion of the LCD, and a second portion being sloping along the direction in which the thickness of the device decreases,
wherein the operating buttons other than the operating buttons mounted on the support means have at least the surfaces thereof, which are on the display means side, sloped in the direction of the thickness of the portable electronic device, and come into contact with a finger, with which the operating buttons are manipulated, along a line, wherein a stroke of press of the operating buttons projecting from a housing of the electronic device prevents the finger from manipulating an adjoining operating button, and wherein the portions of the operating buttons projecting from the housing of the electronic device have a substantially triangular cross section.

14. A portable cellular phone comprising:

a display unit comprising a liquid crystal display (LCD);

a support unit formed with a hard member and placed on part of the liquid crystal display (LCD); and an operating unit including a plurality of operating buttons lined in a plurality of columns, having at least part of the plurality of operating buttons mounted on the support unit, and having at least operating buttons other than the operating buttons mounted on the support unit shaped to come into contact with a finger, with which the operating buttons are manipulated, along a line or at a point, a key sheet member having contacts formed at the positions of the respective buttons:

wherein at least part of the plurality of the operating buttons mounted on the support unit are located at positions of contacts that overlap with a portion of the liquid crystal display (LCD), wherein the support unit is positioned between the overlapping contacts and the overlapping portion of the liquid crystal display (LCD), wherein the support member includes a first portion being parallel to the overlapped portion of the liquid crystal display (LCD), and a second portion being sloping along the direction in which the thickness of the device decreases, wherein the key sheet member includes a first potion being parallel to the overlapped portion of the LCD, and a second portion being sloping along the direction in which the thickness of the device decreases, wherein the operating buttons other than the operating buttons mounted on the support unit have at least the surfaces thereof, which are on the display unit side, sloped in the direction of the thickness of the portable cellular phone, and come into contact with a finger, with which the operating buttons are manipulated, along a line, wherein a stroke of press of the operating buttons projecting from a housing of the portable cellular phone prevents the finger from manipulating an adjoining operating button, and wherein the portions of the operating buttons projecting from the housing of the portable cellular phone have a substantially triangular cross section.

15. The portable cellular phone according to claim 14, wherein the housing has at least a surface thereof, in which the operating buttons other than the operating buttons mounted on the support unit are disposed, sloped towards the end of the housing opposite to the end thereof close to the display unit in the direction of the thickness of the housing.

16. A portable cellular phone comprising:

a display means comprising a liquid crystal display (LCD);

a support means formed with a hard member and placed on part of the liquid crystal display (LCD); and an operating means including a plurality of operating buttons lined in a plurality of columns, having at least part of the plurality of operating buttons mounted on the support means, and having at least operating buttons other than the operating buttons mounted on the support means shaped to come into contact with a finger, with which the operating buttons are manipulated, along a line or at a point, a key sheet member having contacts formed at the positions of the respective buttons;

wherein at least part of the plurality of the operating buttons mounted on the support means are located at positions of contacts that overlap with a portion of the liquid crystal display (LCD), wherein the support means is positioned between the overlapping contacts and the overlapping portion of the liquid crystal display (LCD), wherein the support member includes a first portion being parallel to the overlapped portion of the liquid crystal display (LCD), and a second portion being sloping along the direction in which the thickness of the device decreases, wherein the key sheet member includes a first potion being parallel to the overlapped portion of the LCD, and a second portion being sloping along the direction in which the thickness of the device decreases, wherein the operating buttons other than the operating buttons mounted on the support means have at least the surfaces thereof, which are on the display means side, sloped in the direction of the thickness of the portable cellular phone, and come into contact with a finger, with which the operating buttons are manipulated, along a line, wherein a stroke of press of the operating buttons projecting from a housing of the portable cellular phone prevents the finger from manipulating an adjoining operating button, and wherein the portions of the operating buttons projecting from the housing of the portable cellular phone have a substantially triangular cross section.

17. The portable electronic device according to claim 1, wherein the operating buttons lined in rightmost column and leftmost column are disposed closer to the liquid crystal display (LCD) than the operating buttons lined in any central column.

18. The portable electronic device according to claim 5, wherein the operating buttons lined in rightmost column and leftmost column are disposed closer to the liquid crystal display (LCD) than the operating buttons lined in any central column.

19. The portable electronic device according to claim 13, wherein the operating buttons lined in rightmost column and leftmost column are disposed closer to the liquid crystal display (LCD) than the operating buttons lined in any central column.

20. The portable cellular phone according to claim 14, wherein the operating buttons lined in rightmost column and leftmost column are disposed closer to the liquid crystal display (LCD) than the operating buttons lined in any central column.

21. The portable cellular phone according to claim 16, wherein the operating buttons lined in rightmost column and leftmost column are disposed closer to the liquid crystal display (LCD) than the operating buttons lined in any central column.

* * * * *